United States Patent
Mayet et al.

[11] Patent Number: 6,049,581
[45] Date of Patent: Apr. 11, 2000

[54] NUCLEAR FUEL ASSEMBLY WITH AN UPPER CAP

[75] Inventors: Roland Mayet, Villeurbanne; Pascal Burfin, Saint Genis les Ollières, both of France

[73] Assignees: Framatome, Courbevoie; Cogema, Velizy-Villacoublay, both of France

[21] Appl. No.: 09/101,898

[22] PCT Filed: Feb. 3, 1998

[86] PCT No.: PCT/FR97/00212

§ 371 Date: Oct. 6, 1998

§ 102(e) Date: Oct. 6, 1998

[87] PCT Pub. No.: WO97/28534

PCT Pub. Date: Aug. 7, 1997

[30] Foreign Application Priority Data

Feb. 2, 1996 [FR] France .................................. 96 01307

[51] Int. Cl.[7] .............................. G21C 3/32; G21C 15/04
[52] U.S. Cl. .......................................... 376/352; 376/443
[58] Field of Search .................... 376/352, 443, 376/446

[56] References Cited

U.S. PATENT DOCUMENTS

| | | | |
|---|---|---|---|
| 3,382,153 | 5/1968 | Bigge et al. | 376/446 |
| 3,407,115 | 10/1968 | North, Jr. et al. | 376/446 |
| 3,801,453 | 4/1974 | Jones | 376/446 |
| 3,929,570 | 12/1975 | Jones et al. | 376/446 |
| 4,303,476 | 12/1981 | Leclercq | 376/446 |
| 4,420,457 | 12/1983 | Pargneux | 376/352 |
| 4,427,624 | 1/1984 | Marlatt et al. | 376/352 |
| 4,615,862 | 10/1986 | Huckestein | 376/446 |
| 4,655,995 | 4/1987 | Freeman et al. | 376/352 |
| 4,828,791 | 5/1989 | DeMario | 376/352 |
| 4,832,905 | 5/1989 | Bryan et al. | 376/352 |
| 4,986,959 | 1/1991 | Sparrow et al. | 376/446 |
| 5,037,605 | 8/1991 | Riordan, III | 376/352 |
| 5,133,926 | 7/1992 | Doshi et al. | 376/446 |
| 5,135,710 | 8/1992 | Grattier et al. | 376/352 |
| 5,160,697 | 11/1992 | Verdier et al. | 376/352 |
| 5,200,142 | 4/1993 | DeMario et al. | 376/446 |
| 5,283,812 | 2/1994 | Verdier | 376/352 |
| 5,361,287 | 11/1994 | Williamson | 376/443 |
| 5,363,423 | 11/1994 | Brashier et al. | |

FOREIGN PATENT DOCUMENTS

| | | | |
|---|---|---|---|
| 0 537 044 A1 | 4/1993 | European Pat. Off. | G21C 19/307 |
| 2 171 279 | 2/1973 | France | G21C 3/30 |
| 82 03291 | 2/1982 | France | G21C 3/32 |

*Primary Examiner*—Harvey E. Behrend
*Attorney, Agent, or Firm*—Pollock, Vande Sande & Amernick

[57] ABSTRACT

The top nozzle (6) of the fuel assembly includes a transverse adaptor plate (6a) penetrated by openings (8) for fastening the guide tubes (4) and by openings (9) for water to pass through. The water passage openings (9a) in the adaptor plate (6a) of the top nozzle (6) which are arranged in a central part of the adaptor plate (6a) have a triangular shape with rounded corners and are distributed regularly around at least some of the openings (8) for fastening the guide tubes (4).

5 Claims, 3 Drawing Sheets

NUCLEAR FUEL ASSEMBLY WITH AN UPPER CAP

FIELD OF THE INVENTION

The invention relates to a nuclear fuel assembly having a top nozzle produced in an improved way.

BACKGROUND OF THE INVENTION

Nuclear fuel assemblies, and in particular fuel assemblies for pressurized-water nuclear reactors, have a bundle of fuel rods which are held in parallel arrangements spaced regularly apart from another by a rigid framework.

The framework of the fuel assembly consists, in particular, of spacer grids which are distributed over the length of the fuel assembly and which define cells for receiving and holding the fuel rods in the bundle.

Guide tubes, which are substituted for some of the fuel rods inside the bundle, pass through some of the cells of the grids, and when appropriate are fixed on the grids which they hold and distribute over the length of the fuel assembly.

The guide tubes are longer than the fuel rods, and protrude from the ends of the fuel rod bundle, at the ends of the fuel assembly. The framework of the fuel assembly is closed by nozzles which are fixed onto the protruding end parts of the guide tubes of the framework.

Fuel assemblies which have a right prismatic shape, generally of square cross-section, are placed in the service position inside the core of the nuclear reactor, so that their longitudinal axis is vertical.

The end nozzle of the fuel assembly which is situated at the lower part of the latter, which is referred to as the bottom nozzle and on which the fuel assembly rests, has supporting legs and an adaptor plate penetrated by openings for fastening the guide tubes and openings for water to pass through.

The top nozzle of the fuel assembly, which is located at the second, upper end of the assembly has in particular a transverse adaptor plate which is penetrated by openings for accommodating and fastening the guide tubes and openings for water to pass through.

In order to improve the performance of nuclear fuel assemblies, it is desired to increase as far as possible the combustion ratio of the fuel contained in the assembly and to improve the hydraulic operating conditions of the assembly, through which a flow of cooling water passes from bottom to top inside the core of the reactor.

In particular, in order to improve the hydraulic performance of fuel assemblies, it is desired to reduce as far as possible the head loss of the cooling water when it passes through the transverse adaptor plates of the nozzles, by trying to obtain the greatest possible transparency, i.e., ratio between the area of the openings and the area of the solid parts of the adaptor plates.

The shape and the distribution of the openings for water to pass through the adaptor plates of the nozzles are defined in such a way as to make it possible to fasten the guide tubes of the assembly (for example twenty-four guide tubes) on the adaptor plates of the nozzles and to limit the axial displacement of the fuel rods of the assembly (for example two hundred and sixty-four rods) by adopting a distribution of the openings, and of the ligament defining the openings, such that each of the rods of the assembly faces a ligament.

In particular, as regards the adaptor plate of the top nozzle of the fuel assembly, the water passage openings are of oblong shape and are interposed between the passage holes for the guide tubes. These oblong openings have lengths matched to the size of the portions of the adaptor plate which are interposed between the guide-tube passages.

Such a network of oblong openings of variable dimensions does not make it possible to obtain a very high degree of transparency for the adaptor plate and a uniform distribution of the openings through which the cooling water passes.

SUMMARY OF THE INVENTION

The object of the invention is to provide a nuclear fuel assembly including a bundle of fuel rods which are held by a framework consisting of spacer adaptors which are distributed over the length of the bundle and define cells for the rods to pass through, guide tubes which are substituted for some of the rods in the bundle and are longer than the rods, a bottom nozzle fixed to one end of the guide tubes and a top nozzle fixed to the other end of the guide tubes and including a transverse adaptor plate penetrated by openings for fastening the guide tubes and by openings for water to pass through, this fuel assembly making it possible to reduce the head loss of the nuclear reactor cooling water passing through the assembly, by increasing the transparency of the adaptor plate of the top nozzle.

To this end, the water passage openings in the adaptor plate of the top nozzle which are arranged in a central part of the adaptor plate have a triangular shape with rounded corners and are distributed regularly around at least some of the openings for passing the guide tubes.

BRIEF DESCRIPTION OF THE DRAWINGS

In order to explain the invention clearly, a description will now be given, by way of example, of a nuclear fuel assembly according to the invention and, by way of comparison, the adaptor plate of the top nozzle of a fuel assembly according to the prior art.

DESCRIPTION OF PREFERRED EMBODIMENT

Figure 1:
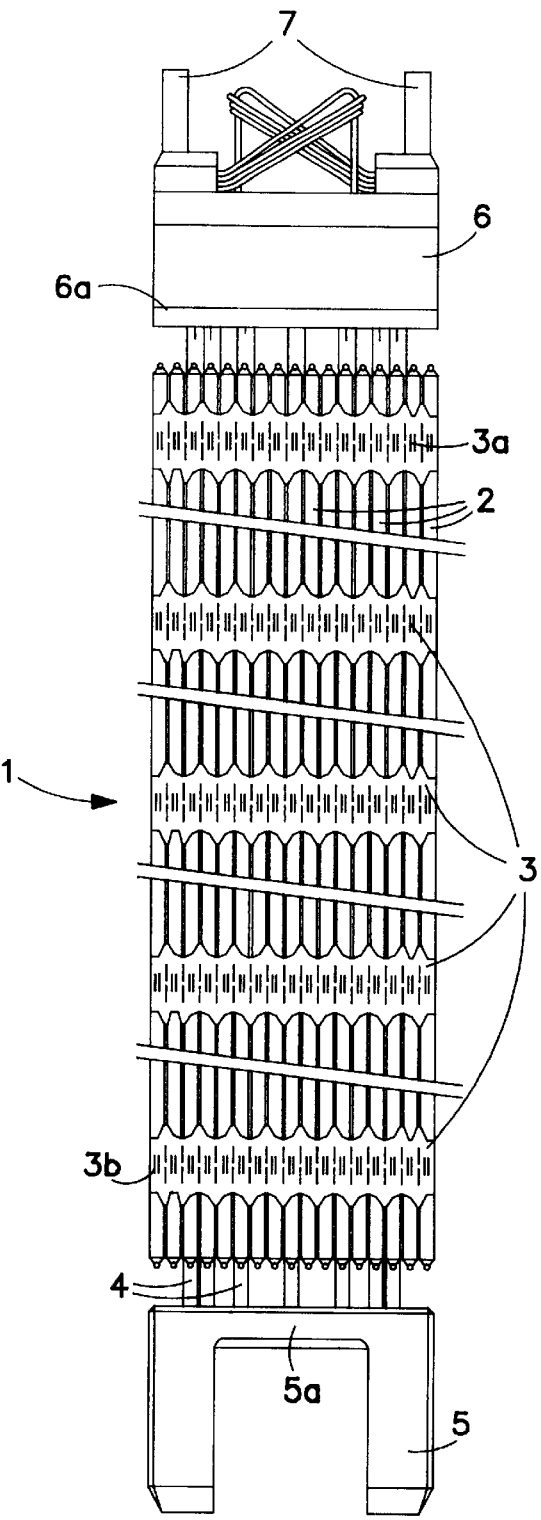
FIG. 1 is an elevation of a nuclear fuel assembly for a pressurized-water nuclear reactor.

FIG. 1 shows a fuel assembly of a pressurized-water nuclear reactor.

The fuel assembly includes a bundle of fuel rods 2 which are placed in mutually parallel arrangements and are held, with irregular spacings in the cross-sections of the bundle, by spacer grids 3 distributed over the length of the bundle.

Some of the positions defined by the cells of the spacer grids 3 are occupied by guide tubes 4, which are longer than the fuel rods 2.

The end parts of the guide tubes 4 protrude from the ends of the bundle of fuel rods 2.

The spacer grids 3 of the fuel assembly are of several types, the end grids 3a and 3b being produced in such a way that they can be fixed on the guide tubes, and the intermediate grids constituting mixing grids for the coolant.

The framework of the fuel assembly, consisting of the guide tubes 4 and the spacer grids 3, 3a and 3b is closed at its ends by nozzles 5 and 6. The end or bottom nozzle 5, arranged in the lower part of the fuel assembly when the latter is in its service position, includes legs for supporting the fuel assembly and a traverse adaptor plate 5a.

The top nozzle 6 includes an adaptor plate 6a and an upper base on which the spring 7 for holding the fuel assembly under the upper core plate of the nuclear reactor is fixed.

Figure 2:
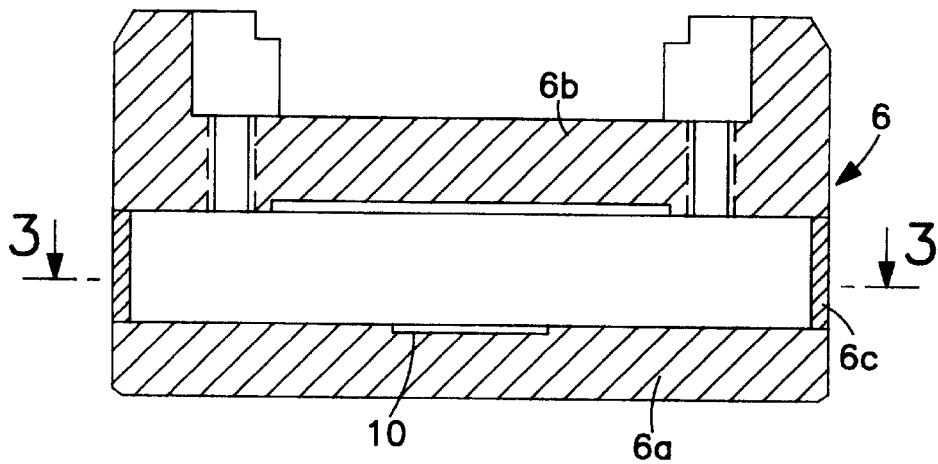
FIG. 2 is an axial section of the top nozzle of the fuel assembly.

As can be seen in FIG. 2, the top nozzle of the fuel assembly 6 includes a transverse plate 6a, referred to as an adaptor plate, which is pierced by openings, a base 6b and an enclosure 6c joining the adaptor plate 6a to the base 6b.

The adaptor plate 6a, the enclosure 6c and the base 6b have a cross-section of square shape which corresponds to the cross-section of the fuel assembly, which is of prismatic shape with a square base.

The base 6b of the top nozzle 6 includes pads for fastening the springs which hold the fuel assembly, as well as openings and positioning pins for engaging and gripping the fuel assembly with a handling means.

Figure 3A:
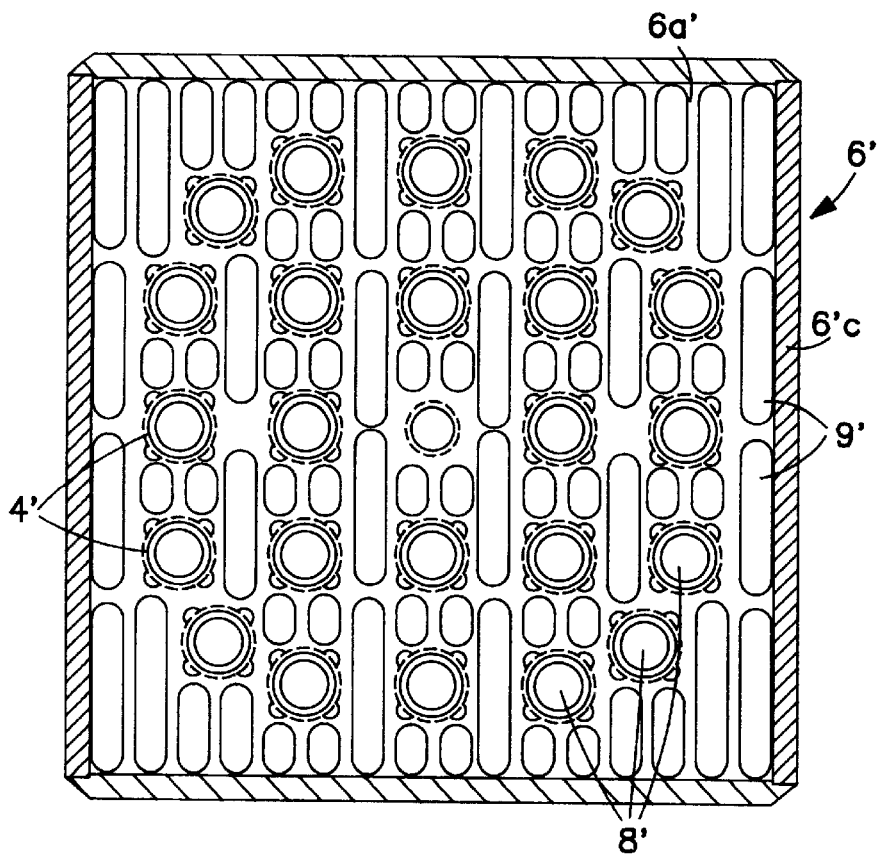
FIG. 3A is a plan view along 3—3 in FIG. 2 of an adaptor plate of a fuel assembly top nozzle according to the prior art.

FIG. 3A represents a plan view of the adaptor plate 6'a of a top nozzle 6' of a fuel assembly according to the prior art.

The adaptor 6'a, on which the enclosure 6' C is fixed, is pierced by an array of circular openings 8', in each of which the end part of a guide tube 4' is fixed. The end parts of the guide tubes 4' can be fixed and locked in the openings 8' by threaded inserts which are then locked in rotation relative to the adaptor plate by crimping in recesses communicating with the openings 8'.

The adaptor plate 6'a has a square shape, and the openings 8' for fastening the twenty-four guide tubes of the fuel assembly are distributed in several rows parallel to the sides of the adaptor plate. Furthermore, an opening for accommodating the end of the instrumentation tube is arranged in the central part of the adaptor plate 6'a.

In order for the water which cools the fuel assembly to pass through the adaptor plate 6'a with the smallest possible head loss, an array of water passage openings is provided, of circular and oblong shapes, these openings being interposed between the openings 8' for fastening the guide tubes 4'.

It is necessary to provide oblong water passage openings 9' aligned in directions parallel to one of the sides of the adaptor plate and having four different lengths. The choice of the arrangement and the length of the oblong water passage openings 9' is defined in such a way as to increase the transparency of the adaptor plate 6'a, i.e., the ratio between the total surface area of the water passage openings 9' and the surface area of the adaptor plate.

The operation of piercing the adaptor plate 6'a and which includes openings having four different dimensions and a complex distribution is difficult and time-consuming.

Furthermore, the transparency of the adaptor plate is still relatively low since a number of zones around the guide-tube fastening openings cannot be pierced, and also because it is necessary to limit the axial displacement of the rods of the assembly, by providing an arrangement of the openings of the adaptor plate such that each of the rods faces one ligament. In addition, if the adaptor plate is to have sufficient mechanical strength, its thickness cannot be reduced beyond a certain limit.

Figure 3B:
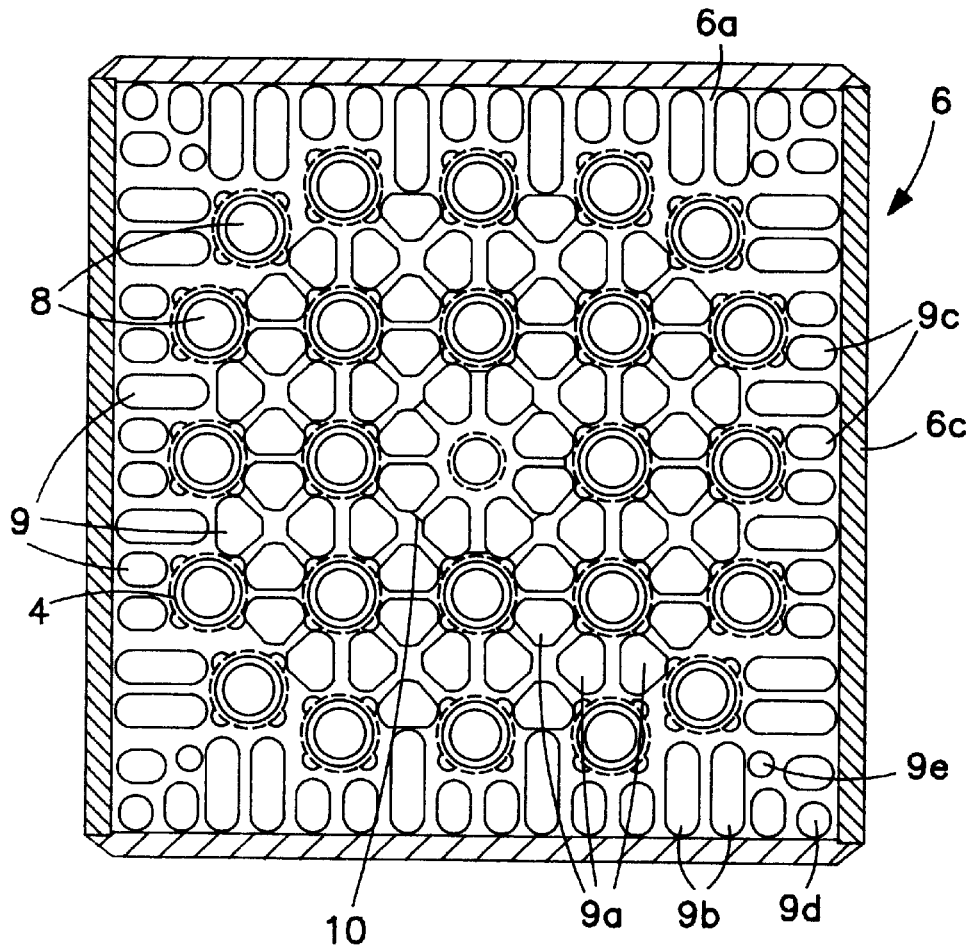
FIG. 3B is a plan view similar to FIG. 3A, of an adaptor plate of a fuel assembly according to the invention.

FIG. 3B represents the adaptor plate 6a of the top nozzle 6 of a fuel assembly according to the invention.

The adaptor plate 6a, which has a square shape, is fixed on the enclosure 6c of the nozzle.

The twenty-four openings 8 for fastening the end parts of the guide tubes 4 have an arrangement similar to the arrangement of the twenty-four openings 8' for fastening the guide tubes 4' of the assembly according to the prior art.

The openings 9 for the cooling water to pass through the adaptor plate 6a have variable shapes.

In a central part of the adaptor plate 6a, the water passage openings 9a are all identical and have a triangular shape with rounded corners. The openings 9a of triangular shape with rounded corners are regularly distributed around the openings 8 for fastening eight guide tubes 4 of the fuel assembly and the central instrumentation tube.

The eight positions of openings for fastening guide tubes 4, in the central part of the adaptor plate 6a, are the central position of the instrumentation tube of the fuel assembly, are surrounded by a complete row of triangular openings with rounded corners 9a.

The sixteen other openings 8 for fastening guide tubes 4 of the fuel assembly, which are located towards the outside of the adaptor plate 6a, are surrounded only partially by triangular openings with rounded corners 9a.

The peripheral part of the adaptor plate 6a, along the four outer edges over which the belt 6c is fixed, is penetrated by oblong openings 9b and 9c having two different lengths.

The piercing of the adaptor plate 6a is completed in each of the corners of the adaptor plate by circular openings 9d and 9e which also constitute water passage openings.

Piercing the adaptor plate 6a in the form of a majority of triangular openings with rounded corners 9a located in the central part of the adaptor plate, and complementary oblong 9b and 9c and circular 9d and 9e openings, has made it possible to obtain a degree of transparency of the adaptor plate to the cooling water which is substantially improved in comparison with the transparency of a plate according to the prior art, including only water passage openings of oblong shape.

The adaptor plate is pierced in such a way as to obtain the best possible compromise between reducing the head loss of the coolant when it passes through the adaptor plate, and obtaining an adaptor plate which is of sufficient mechanical strength.

In particular, the array of openings in the adaptor plate is entirely symmetrical with respect to the diagonals of the plate, which is of square shape, so that a uniform stress distribution is obtained.

It is thus possible to increase the transparency of the plate, i.e., the total area of the water passages, and to reduce the thickness of the plate, while retaining satisfactory mechanical strength.

It has thus been possible to increase the total surface area of the water passages and the adaptor plate by 5%, and to reduce the thickness of the adaptor plate, so as to limit the head loss.

Because of a better distribution and a more highly adapted shape of the water passage openings, and the reduction in the thickness of the adaptor plate, the hydraulic resistance which the adaptor plate presents to the cooling water as it passes through has been reduced by 7%.

As can be seen in FIGS. 2 and 3B, a cavity or sink 10 is provided at the centre of the adaptor plate 6a, throughout the zone of the adaptor plate occupied by the central instrumentation tube and the openings 9a surrounding this tube. It is in this way possible to reduce the height of the nozzle slightly while accommodating a rod cluster inserted into the assembly.

The fuel assembly according to the invention therefore exhibits better hydraulic operation than the fuel assemblies according to the prior art, and can make it possible to obtain a better combustion ratio over its life.

Openings in the peripheral part of the adaptor plate of the top nozzle of the fuel assembly may have a shape and a distribution other than the shape and distribution which have been described.

The size of the triangular openings with rounded corners is optimized according to the dimensions of the parts of the adaptor plate which are located around the guide-tube fastening openings, in order to ensure maximum transparency.

In the embodiment which has been described and represented, each of the openings for fastening a guide tube, which are located in the central part of the adapter plate, is surrounded by eight water passage openings of triangular shape with rounded corners. It is, of course, possible to provide a different number and distribution of the triangularly shaped openings.

Furthermore, it is possible to combine the advantages claimed by the novel piercing of the adaptor plate of the top nozzle with other advantages which are obtained by reduction in the thickness of the adaptor plate and novel dimensioning of the nozzle.

The invention applies to any nuclear fuel assembly including a framework closed by a top nozzle which includes an adaptor plate pierced by water passage openings.

What is claimed is:

1. A nuclear fuel assembly including a bundle of fuel rods which are held by a framework consisting of spacer grids which are distributed over the length of the bundle and define cells for the fuel rods to pass through, guide-tubes which are situated for some of the fuel rods in the bundle and are longer than the fuel rods, a bottom nozzle fixed to one end of the guide tubes and a top nozzle fixed to the other end of the guide tubes and including a transverse adaptor plate having through-openings for fastening the guide tubes and through-openings for water to pass through, said through-openings for fastening the guide tubes comprising a first plurality of guide tubes through-openings and a second plurality of guide tubes through-openings, said first plurality of guide tubes through-openings being positioned in a peripheral part of said adaptor plate and each through-opening of said second plurality of guide tubes through-openings being positioned in a central part of said adaptor plate situated inwardly with respect to said first plurality of guide tubes through-openings, wherein each of water through-openings situated in said central part of said adaptor plate has a triangular shape with rounded corners and each of said guide tubes openings of said second plurality of guide tubes through-openings is surrounded by a row of water through-openings of triangular shape with rounded corners, said water openings of triangular shape all being identical.

2. The fuel assembly according to claim 1, wherein water passage openings arranged in the peripheral part of the adaptor plate have an oblong shape and are of two different lengths.

3. The fuel assembly according to claim 1, wherein water passage openings further include circular openings arranged close to corners of the adaptor plate of the top nozzle of square shape.

4. The fuel assembly according to claim 1, including four guide tubes fastening openings distributed through the cross-section of said adaptor plate of said top nozzle and one central instrumentation tube fastened in a central through-opening, wherein said first plurality of guide tubes through-openings is comprised of sixteen guide tubes through-openings and said second plurality of guide tubes through-openings is comprised of eight guide tubes through-openings and said central through-opening.

5. The fuel assembly according to claim 4, wherein each of the guide tubes openings of the second plurality of guide tubes openings and the central through-opening are surrounded by eight water passage openings of triangular shape with regularly distributed rounded corners.

* * * * *

UNITED STATES PATENT AND TRADEMARK OFFICE
CERTIFICATE OF CORRECTION

PATENT NO. : 6,049,581
DATED : April 11, 2000
INVENTOR(S) : Mayet et al.

It is certified that error appears in the above-identified patent and that said Letters Patent is hereby corrected as shown below:

<u>Title page</u>,
Item [22], PCT Filed, "Feb. 3, 1998" should be -- Feb. 3, 1997 --.

Signed and Sealed this

Twenty-first Day of June, 2005

JON W. DUDAS
*Director of the United States Patent and Trademark Office*